United States Patent
Leff Yaffe et al.

(10) Patent No.: US 10,549,700 B2
(45) Date of Patent: Feb. 4, 2020

(54) PICKUP BOX ADAPTABLE SIDE-MOUNTED RAIL

(71) Applicant: FORD GLOBAL TECHNOLOGIES, LLC, Dearborn, MI (US)

(72) Inventors: Jonatan Leff Yaffe, Mexico City (MX); Carlos Emilio Merino, Benito Juarez (MX); Todd John Mueller, Canton, MI (US); Pedro Montoya, Mexico City (MX); Luis Manuel Garcia, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 15/436,000

(22) Filed: Feb. 17, 2017

(65) Prior Publication Data
US 2018/0236944 A1   Aug. 23, 2018

(51) Int. Cl.
*B60R 9/00*   (2006.01)

(52) U.S. Cl.
CPC ...................................... *B60R 9/00* (2013.01)

(58) Field of Classification Search
CPC .... B60R 9/02; B60R 9/10; B60R 9/00; B60R 9/045; B60R 9/08; B60R 2011/0084
USPC .................................................. 224/402–405
See application file for complete search history.

(56) References Cited

U.S. PATENT DOCUMENTS

| | | | |
|---|---|---|---|
| 4,770,579 A | 9/1988 | Aksamit | |
| 5,255,951 A | 10/1993 | Moore, III | |
| 5,427,487 A | 6/1995 | Brosfske | |
| 5,836,490 A | 11/1998 | Price | |
| 5,947,356 A * | 9/1999 | Delong | B60R 9/00 224/404 |
| 5,988,722 A * | 11/1999 | Parri | B60P 1/003 224/403 |
| 6,206,624 B1 * | 3/2001 | Brandenburg | B60P 7/14 410/121 |
| 6,302,280 B1 * | 10/2001 | Bermes | B60R 9/00 211/175 |
| 6,511,272 B2 * | 1/2003 | Stafford | B60P 7/15 410/121 |
| 7,762,408 B2 * | 7/2010 | Sargent | B60P 3/14 211/85.7 |
| 8,820,811 B1 | 9/2014 | Hemphill et al. | |
| 8,905,280 B2 | 12/2014 | Martin | |
| 9,745,002 B2 * | 8/2017 | Eddings, Jr. | B62D 33/0207 |
| 2013/0075436 A1 * | 3/2013 | Martin | B60R 9/00 224/403 |
| 2016/0059906 A1 * | 3/2016 | Leitner | B62D 33/0207 296/3 |
| 2018/0361944 A1 * | 12/2018 | Marchlewski | B60R 9/10 |

* cited by examiner

*Primary Examiner* — Corey N Skurdal

(74) *Attorney, Agent, or Firm* — Jason Rogers; Vichit Chea; King & Schickli, PLLC

(57) ABSTRACT

An accessory support for a vehicle cargo area includes a guide assembly adapted to provide vertical and lateral adjustability and at least one support member slidably carried by the guide assembly. The guide assembly includes a first pair of guide rails each including one or more vehicle z-axis oriented guide channels and a second pair of guide rails each including one or more vehicle y-axis oriented guide channels.

17 Claims, 3 Drawing Sheets

PICKUP BOX ADAPTABLE SIDE-MOUNTED RAIL

TECHNICAL FIELD

This disclosure relates generally to vehicle cargo area accessory racks. In particular, the disclosure relates to a side-mounted sliding adjustable rail for a vehicle cargo area such as a pickup truck bed.

BACKGROUND

Vehicle cargo areas provide a convenient means of storing and hauling various items. For cargo areas such as pickup truck beds and the like, regardless of the size of the vehicle the usable cargo space is finite and limited by the cargo area dimensions. Moreover, such cargo areas can be limited in terms of the types of cargo they can safely carry. Typically, the only OEM devices provided for a cargo area are tie-downs mounted on a cargo area side and/or top rail.

Users of vehicles with cargo areas such as pickup truck beds often want to carry a variety of items, some of which are not amenable to simply placing in the bed and/or attaching to a provided tie-down. Often, the items to be carried required specialized accessory racks to prevent item travel and associated potential damage. Still more, users may wish to extend the carrying capacity of the cargo area. Conventional solutions for these problems, while potentially effective for their intended purpose, tend to focus on cargo carrying area/capacity at the expense of considerations such as vehicle aerodynamics, which in turn potentially compromises fuel efficiency. Alternative locations for cargo accessory racks such as vehicle roof panels can be effective, but are inconvenient for the user. Also, placing items on a vehicle roof, along with potentially compromising vehicle aerodynamics and attendant fuel efficiency, effectively increases the vehicle height. This can create issues when passing into/through structures with low overhangs such as parking garages, residence garage entryways, etc.

To solve this and other problems, the present disclosure is directed to an accessory support comprising a side-mounted adjustable rail for a vehicle cargo area such as a pickup bed side panel. Conveniently, the described side-mounted adjustable rail attaches to existing attachment sites such as manufacturer-provided tie down or cleat apertures disposed on or in the pickup bed. The accessory support conveniently provides vehicle-inboard/outboard and up/down adjustability, and can be used alone or with other rail or rack systems to carry a variety of accessories and items.

SUMMARY

In accordance with the purposes and benefits described herein, in one aspect of the present disclosure an accessory support for a vehicle cargo area is provided, comprising a guide assembly adapted to provide vertical and lateral adjustability and at least one support member slidably carried by the guide assembly. The accessory support may further include at least one guide assembly bracket and/or fastener adapted for releasably attaching a portion of the guide assembly to a portion of the vehicle cargo area. The at least one guide assembly fastener is adapted to attach the guide rail assembly to a side panel of the vehicle cargo area.

In embodiments, the guide assembly comprises a first pair of guide rails each including one or more vehicle z-axis oriented guide channels. The guide assembly further comprises a second pair of guide rails each including one or more vehicle y-axis oriented guide channels. The first pair of guide rails may each further include at least one tab adapted to be slidably received in the one or more vehicle y-axis oriented guide channels. Likewise, the at least one support member may include at least one tab adapted to be slidably received in the one or more vehicle z-axis oriented guide channels.

The accessory support may further include one or more guide rail fasteners for releasably fastening the first pair of guide rails to the second pair of guide rails and for releasably fastening the at least one support member to the second pair of guide rails. In embodiments, quick-release fasteners are provided.

In another aspect, an accessory support assembly for a vehicle cargo area is provided, comprising a pair of accessory supports, adapted for attaching to a vehicle cargo area. Each accessory support is substantially as described above, comprising a guide assembly adapted to provide vertical and lateral adjustability and at least one support member slidably carried by the guide assembly. The accessory support assembly may be adapted for attachment to any vehicle cargo area interior, such as a pickup truck bed interior.

In the following description, there are shown and described embodiments of an accessory support for a vehicle cargo area. As it should be realized, the devices are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of an accessory support for a vehicle cargo area, and together with the description serve to explain certain principles thereof. In the drawings.

Reference will now be made in detail to embodiments of a side-mounted adjustable rail for a vehicle cargo area, examples of which are illustrated in the accompanying drawing figures. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

DETAILED DESCRIPTION

Preliminarily, certain elements herein are described according to their orientation and/or path of travel relative to a vehicle 100, i.e. "vehicle-forward," "vehicle-rearward," "vehicle-inboard," "vehicle-outboard," etc. Other elements are described relative to various vehicle axes such as the x-axis, y-axis, and z-axis. Such terms are well known in the art. However, as will be appreciated these designations refer to the orientation and/or path of travel of the elements relative to a vehicle longitudinal or x-axis, a vehicle lateral or y-axis, etc. So, as a non-limiting example, an element described as oriented in a vehicle-forward orientation is facing vehicle-forwardly, i.e. facing towards the vehicle 100 nose along the vehicle x-axis. As another example, an element described as adjustable or slidable in a vehicle-inboard or vehicle-outboard direction can be translated along a plane defined by the vehicle y-axis.

Figure 1:
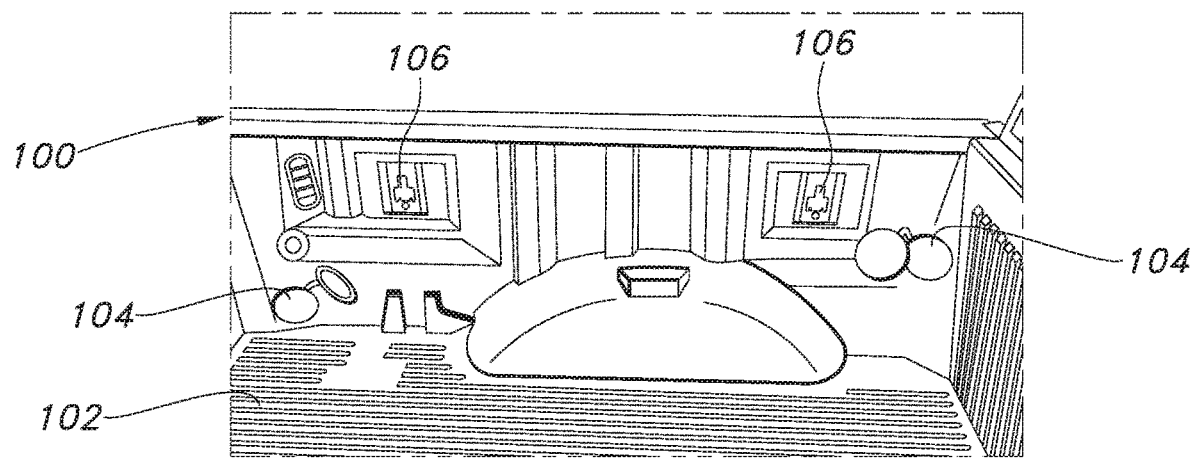
FIG. 1 shows an interior side panel of a pickup truck bed.

FIG. 1 illustrates a vehicle 100 including a cargo area 102, in the depicted embodiment being a pickup truck bed. However, it will be understood that the descriptions herein are equally applicable to other styles of cargo area, such as an enclosed rear cargo area of a sport-utility vehicle, van, etc. The cargo area 102 interior includes various elements to which items can be secured, such as tie-downs 104 and cleat holes 106.

Figure 2:
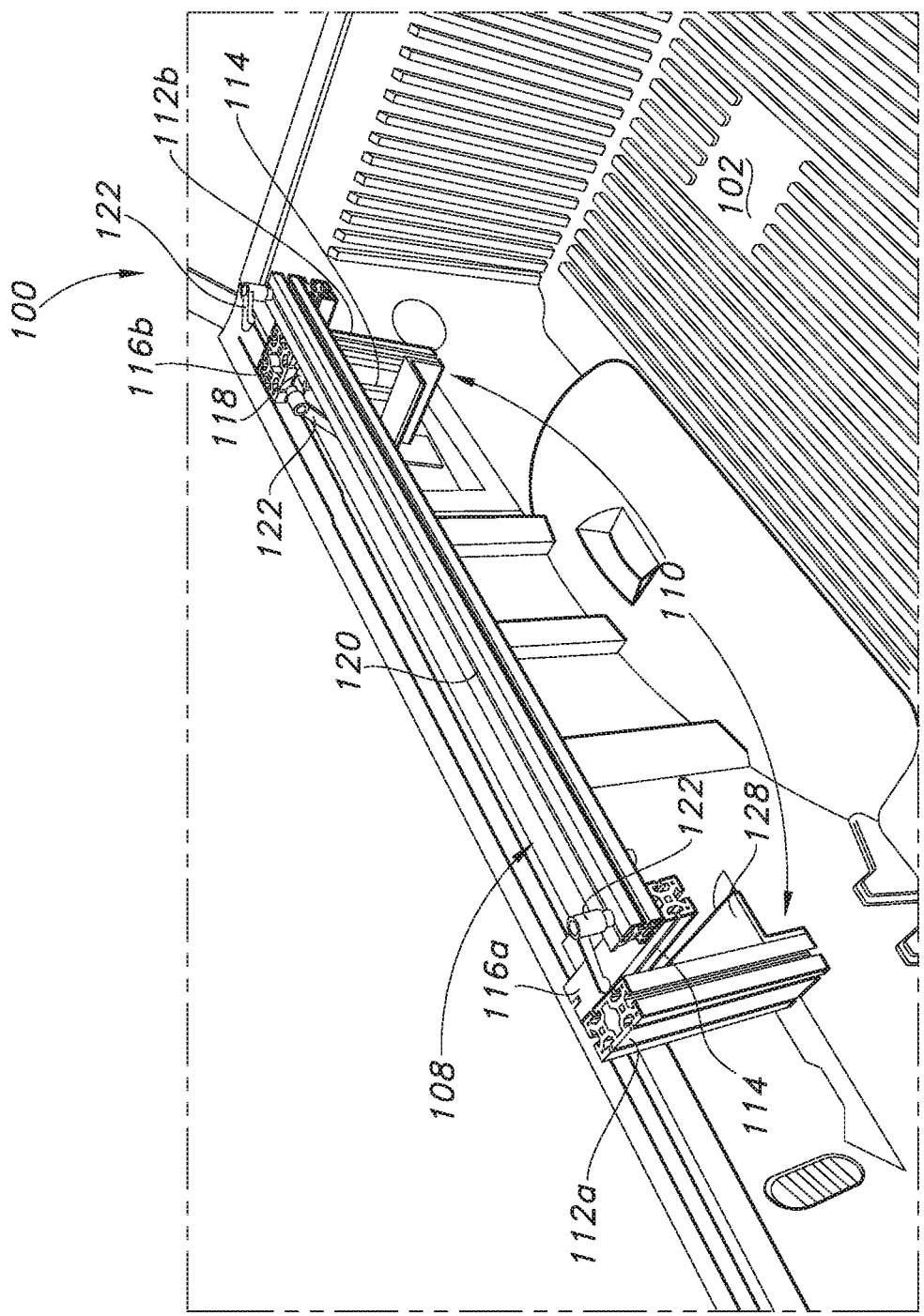
FIG. 2 shows a rear perspective view of an accessory support system according to the present disclosure, mounted to the interior side panel of FIG. 1.

FIG. 2 illustrates an embodiment of an accessory support 108 adapted for attaching to the cargo area 102. Only one accessory support 108 is shown and described herein, attached to a side panel of the cargo area 102 interior. However, it will be appreciated that the accessory support 108 can form part of an assembly wherein the accessory support 108 is mirrored on an opposed side panel of the cargo area 102 interior.

The accessory support 108 is configured for lateral and vertical adjustability. To accomplish this, in one embodiment the accessory support 108 includes a guide assembly 110 defined by a first pair of guide rails 112a, 112b each including one or more vehicle z-axis oriented guide channels 114. The guide assembly 110 further includes a second pair of guide rails 116a, 116b each including one or more vehicle y-axis oriented guide channels 118. The accessory support further includes a support member 120 slidably carried by the guide assembly 110.

In embodiments, the second pair of guide rails 116a, 116b each include a portion adapted to be slidably received within the one or more vehicle z-axis oriented guide channels 114. This can be accomplished by various means, including providing guide rails 116a, 116b having end portions configured to slide within the one or more vehicle z-axis oriented guide channels 114, providing guide rails 116a, 116b having end tabs configured to slide within the one or more vehicle z-axis oriented guide channels 114, and by other means.

In turn, the support member 120 includes a portion adapted to be slidably received within the one or more vehicle y-axis oriented guide channels 118. Again, this can be accomplished by various means, including providing a support member 120 having end portions configured to slide within the one or more vehicle y-axis oriented guide channels 118, providing a support member 120 having end tabs configured to slide within the one or more vehicle y-axis oriented guide channels 118, and by other means.

Fasteners 122 are provided for securing the second pair of guide rails 116a, 116b in place to the first pair of guide rails 112a, 112b and for securing the support member 120 in place to the second pair of guide rails. This is done when a desired vertical and/or lateral position is established for the support member 120 as will be described. In the depicted embodiment, quick-release fasteners 122 are provided, similar in configuration and operation to bicycle fork mount traps as are known in the art. Conveniently, by use of such quick-release fasteners 122 a user need only turn a handle to loosen the quick-release fastener 122 to allow sliding translation of the support member 120 and/or second pair of guide rails 116a, 116b, followed by turning the handle in the opposite direction to prevent such relative translational movement. However, use of other releasable fastener types such as conventional screws, bolts/nuts, etc. is contemplated.

Figure 3:
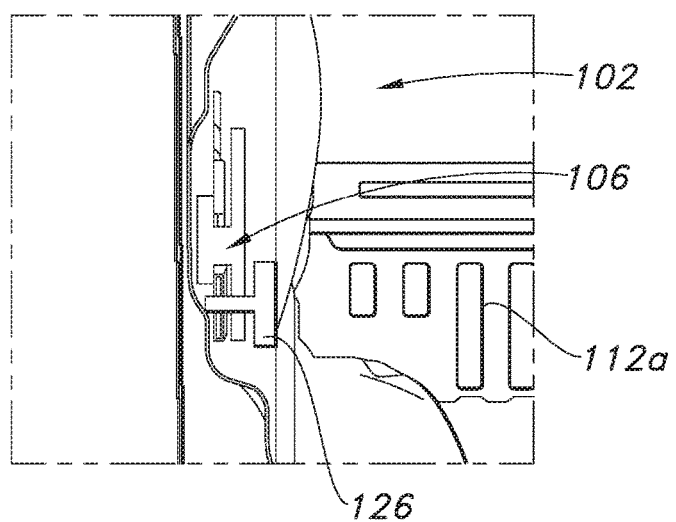
FIG. 3 shows a fastener for securing the accessory support system of FIG. 2 to a vehicle cargo area interior.

The accessory support 108 may be attached to a side panel of the cargo area 102 by any suitable means. In the depicted embodiment, each of the first pair of guide rails 112a, 112b are attached to a bracket 124, which in turn is attached to a portion of the cargo area 102 side wall such as to cleat holes 106 by a fastener such as a pin/bolt fastener 126 (see FIG. 3). However, use of other fasteners is contemplated.

Figure 4:
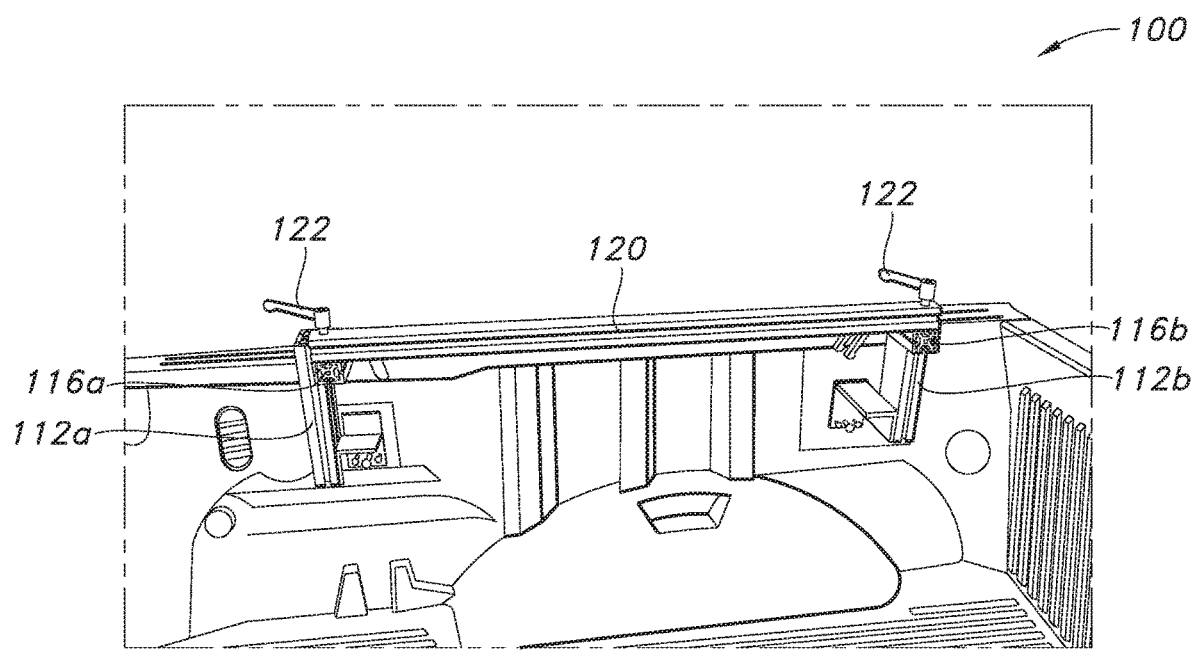
FIG. 4 shows a side view of the accessory support system of FIG. 2.
Figure 5:
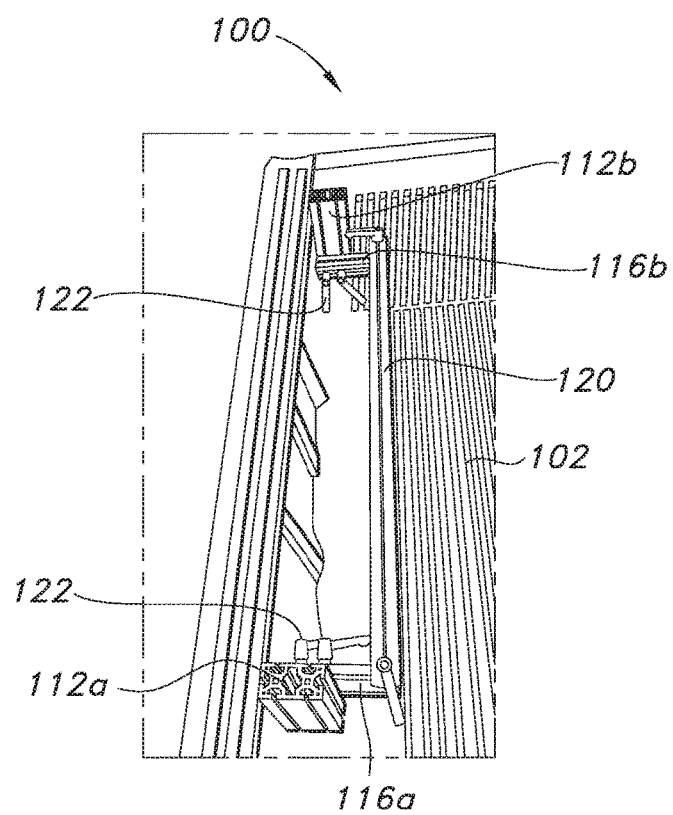
FIG. 5 shows a rear view of the accessory support system of FIG. 2.

In use, the accessory support 108 provides convenience and ease of adjustability in both a vehicle up/down direction and a vehicle inboard/outboard direction. For vehicle up/down adjustability, the user need only loosen the quick-release fasteners 122 securing the second pair of guide rails 116a, 116b to the first pair of guide rails 112a, 112b, slidingly translate the support member 120 to the desired vertical position relative to the cargo area 102 load floor, and re-tighten the quick-release fastener (see arrows, FIG. 4). Likewise, for vehicle inboard/outboard adjustability the user need only loosen the quick-release fasteners 122 securing the support member 120 to the second pair of guide rails 116a, 116b, slidingly translate the support member 120 to the desired lateral position relative to a cargo area 102 side wall, and re-tighten the quick-release fastener (see arrows, FIG. 5).

As will be appreciated, by the described accessory support 108 and an accessory support 108 assembly comprising a pair of accessory supports attached to opposed side walls of a cargo area 102, flexibility is provided for attachment of aftermarket/third party accessory racks. As non-limiting examples, a bicycle rack, kayak holder, roof rack box storage, etc. (not shown) may include laterally disposed rails (not shown) intended to be attached to vehicle 100 roof rails (not shown) and adapted to support one or more bicycles (not shown) thereon. In one non-limiting embodiment, it is contemplated to provide support members 120 configured and dimensioned according to industry standards for length and thickness of vehicle roof rails. A user may adjust the accessory supports 108 described above according to a desired lateral/vertical position sufficiently to accommodate such laterally disposed rails, and by the described dimensions of the support members 120 can simply attach the bicycle rack to the support members rather than to roof racks. This allows use of the aftermarket bicycle rack in the cargo area 102 that would previously not have been possible, without requiring manufacturer-specific equipment to accommodate same.

Obvious modifications and variations are possible in light of the above teachings. All such modifications and variations are within the scope of the appended claims when interpreted in accordance with the breadth to which they are fairly, legally and equitably entitled.

What is claimed:

1. An accessory support for a vehicle cargo area, comprising:
    a guide assembly comprising a plurality of guide rails adapted to provide vertical and lateral adjustability to at least one support member adapted for slidable translation in one or more guide channels of at least one of the plurality of guide rails wherein said plurality of guide rails includes a first pair of guide rails each including one or more vehicle z-axis oriented guide channels.

2. The accessory support of claim 1, further including at least one guide assembly bracket and/or fastener adapted for releasably attaching a portion of the guide assembly to a portion of the vehicle cargo area.

3. The accessory support of claim 2, wherein the at least one guide assembly fastener is adapted to attach the guide assembly to a side panel of the vehicle cargo area.

4. The accessory support of claim 1, wherein the guide assembly further comprises a second pair of guide rails each including one or more vehicle y-axis oriented guide channels.

5. The accessory support of claim 4, wherein the second pair of guide rails each further includes at least one tab adapted to be slidably received in the one or more vehicle z-axis oriented guide channels.

6. The accessory support of claim 4, wherein the at least one support member includes at least one tab adapted to be slidably received in the one or more vehicle y-axis oriented guide channels.

7. The accessory support of claim 6, further including one or more guide rail fasteners for releasably fastening the first pair of guide rails to the second pair of guide rails and for releasably fastening the at least one support member to the second pair of guide rails.

8. The accessory support of claim 7, wherein the one or more guide rail fasteners are quick-release fasteners.

9. An accessory support assembly for a vehicle cargo area comprising a pair of accessory supports adapted for attaching to a vehicle cargo area, wherein each accessory support comprises:
  a guide assembly comprising a plurality of guide rails adapted to provide vertical and lateral adjustability to at least one support member adapted for slidable translation in one or more guide channels of at least one of the plurality of guide rails wherein said plurality of guide rails includes a first pair of guide rails each including one or more vehicle z-axis oriented guide channels.

10. The accessory support assembly of claim 9, further including at least one guide assembly bracket and/or fastener adapted for releasably attaching a portion of each guide assembly to a portion of the vehicle cargo area.

11. The accessory support assembly of claim 10, wherein the at least one guide assembly fastener is adapted to attach each guide assembly to a side wall of the vehicle cargo area.

12. The accessory support assembly of claim 9, wherein each guide assembly further comprises a second pair of guide rails each including one or more vehicle y-axis oriented guide channels.

13. The accessory support assembly of claim 12, wherein the second pair of guide rails each further includes at least one tab adapted to be slidably received in the one or more vehicle z-axis oriented guide channels.

14. The accessory support assembly of claim 12, wherein the at least one support member includes at least one tab adapted to be slidably received in the one or more vehicle y-axis oriented guide channels.

15. The accessory support assembly of claim 14, further including one or more guide rail fasteners for releasably fastening the first pair of guide rails to the second pair of guide rails and for releasably fastening the at least one support member to the second pair of guide rails.

16. The accessory support assembly of claim 15, wherein the one or more guide rail fasteners are quick-release fasteners.

17. The accessory support assembly of claim 9, wherein the vehicle cargo area is a pickup truck bed.

* * * * *